A. CUMMINGS.

WOOD-SCREW.

No. 6,729. Reissued Nov. 9, 1875.

Witnesses,

F. H. Galpin

J. M. Galpin

Inventor,

Allan Cummings,

By A. L. Thumbow

Attorney.

UNITED STATES PATENT OFFICE.

ALLAN CUMMINGS, OF NEW YORK, N. Y., ASSIGNOR TO THE NEW YORK SCREW COMPANY, OF SAME PLACE.

IMPROVEMENT IN WOOD-SCREWS.

Specification forming part of Letters Patent No. 161,390, dated March 30, 1875; reissue No. 6,729, dated November 9, 1875; application filed August 4, 1875.

DIVISION A.

*To all whom it may concern:*

Be it known that I, ALLAN CUMMINGS, of the city, county, and State of New York, have invented an Improvement in Screws, of which the following is a specification:

The object of my invention is to provide a screw of any and all varieties, so constructed that they may be readily inserted and driven home, or withdrawn when desired, with great rapidity and safety, without the slightest danger of injuring the head of the screw, or the work into which the screw is being driven, by the reason of the slipping of the driving instrument. In order to fully and satisfactorily accomplish this object, I form in the center of the head of a screw of any shape, size, or style, or adapted to any purpose, a deep cavity or hole of suitable shape, into which cavity or hole a properly-shaped driving-tool, coinciding in form with that of the cavity, is inserted, and furnishes the leverage for driving or withdrawing the screw. In carrying out my invention I have made this cavity or hole angular in shape, this form being best adapted for the purpose by reason of its furnishing the best form for giving increased power, as well as for the additional reason that it is the most readily formed in the screw-head. Any angular-shaped cavity other than square will fully answer the purposes of my invention.

In the following description I have carefully pointed out and described the various modes and forms to which my improvement may be applied and adapted.

Figure 1:
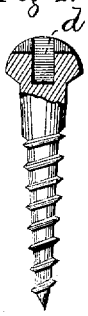
Figure 2:
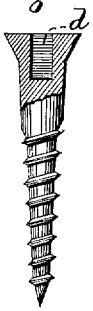
Figure 4:
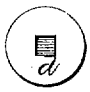
Figure 3:
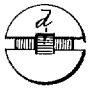
Figure 5:
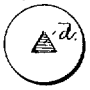

In the drawings which form a part of this specification, Figure 1 represents an elevation, partially in section, of an ordinary wood-screw having a round head, and showing the application of my invention when combined with the usual slot. Fig. 2 is an elevation, partially in section, of an ordinary screw, from the head of which the usual slot is omitted and an angular cavity only used. Fig. 3 is a plan view of the head of the ordinary screw, with slot and cavity as shown in Fig. 1; and Figs. 4 and 5 are plan views of that shown in Fig. 2.

Similar letters of reference indicate corresponding parts.

It is a well-known and fully-established fact that the ordinary screw-head, which is provided with a narrow shallow slot or "nick," milled across its face, in which slot the driving-lever is applied, is very susceptible to injury caused mainly by the frequent slipping of the screw-driver from the slot when the screw is being "set home" in either wood or metal, or being withdrawn from the same. It is also not an unusual occurrence to have one half of the screw-head split off whenever an extra amount of power is applied through the ordinary screw-driver. These mishaps are so common as to be notorious among the manufacturers and mechanics who use large numbers of screws, and the loss resulting from them annually amounts to large sums of money. It is to entirely obviate all of these difficulties, to gain additional strength in the screw-head, and increased driving-power, also to render it absolutely impossible to injure the screw-head in any manner, that I have made my present invention. Large quantities of what are known as "capped screws," for ornamental purposes are now made and extensively used in fitting and finishing up the interior of cars, stages, coaches, in furniture, and other similar purposes. The heads of these screws, either flat or rounded, are covered with a thin metallic plate, which is plated with gold, siver, or nickel, as may be desired. In the process of capping the plate is cut away from that portion of the head of the screw in which the slot or "nick" is formed. This metallic cap or cover being very thin, the utmost nicety in use is called for. In driving them with the ordinary screw-driver it is very common for it to slip from the slot, tearing up the cap, and thus spoiling its appearance and necessitating its being thrown aside. It will readily be seen that by dispensing with the usual slot or nick in this class of screws, and using in lieu thereof a cavity of angular shape formed in the center of the head and a properly-shaped driving-tool, perfect safety is insured to the metallic cap, as well as to the head of the screw. This insures perfect work and absolutely guarantees no loss of screws. The process of capping is also simplified by reason of the absence of the slot or nick. Large quantities of soft-metal screws, in brass or similar composition metals, are also much used, and the same difficulties are also here met with. In such cases my improvement obviates all trouble.

It is in the removal or withdrawing of screws that my invention, combined with the improved form of driving-tool, proves its great utility and advantages. Screws that have been long embedded and rusted in are difficult to remove with an ordinary screw-driver, it invariably slipping from the slot, repeating the same until it is utterly impossible to start the screw from its bed, or to obtain any hold in the then damaged slot or nick. The screw has then to be removed by cutting out, to the great damage of the work in which it was located. My invention completely eradicates all this trouble, as a screw having a cavity in its head is readily and surely withdrawn at the first trial.

In Fig. 1 I have shown a round-headed screw of the ordinary shape. In the center of the screw-head is formed a deep angular cavity, which is of such shape and depth as may, in practice, be found to be best and necessary to fully accomplish the objects of my invention. This cavity is designated by the letter *d*, in the various figures of the drawings. I have found the square-sided cavity, as shown in Fig. 3, the most preferable angular form, but it may be made either octagonal, triangular, or other angular form, as illustrated in Figs. 4 and 5. It may be made the same size its entire depth, or, if preferred, made slightly tapering from top to bottom. These cavities may be formed in the screw-head by the screw-machine at the same time the screw is being formed, or they may be made in a distinct machine, as a separate process from the formation of the screw itself. These operations are well-known mechanical processes, and, being no part of my present invention, require no detailed description herewith.

It is obvious that my improvement may be readily applied to all of the known forms of screws, both machine and wood.

Having thus fully described my invention, what I claim as new, and desire to secure by Letters Patent, is—

A screw the head of which, at its center, is provided with an angular cavity in lieu of the usual slot or nick, substantially as and for the purposes as herein shown and described.

ALLAN CUMMINGS.

In presence of—
A. L. MUNSON,
R. J. GRIFFITH.